United States Patent
Raskar et al.

(10) Patent No.: US 10,742,585 B2
(45) Date of Patent: Aug. 11, 2020

(54) HAPTIC MESSAGE DELIVERY

(71) Applicant: Facebook, Inc., Menlo Park, CA (US)

(72) Inventors: Ramesh Raskar, Palo Alto, CA (US); Nafissa Yakubova, Menlo Park, CA (US); Ahmad Byagowi, Menlo Park, CA (US); Marie K. Herring, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 162 days.

(21) Appl. No.: 15/863,805

(22) Filed: Jan. 5, 2018

(65) Prior Publication Data
US 2019/0215289 A1 Jul. 11, 2019

(51) Int. Cl.
*H04L 12/58* (2006.01)
*G08B 6/00* (2006.01)

(52) U.S. Cl.
CPC ........... *H04L 51/24* (2013.01); *G08B 6/00* (2013.01); *H04L 51/32* (2013.01)

(58) Field of Classification Search
CPC .......... G06F 3/016; G06F 3/011; G06F 3/015; G06F 3/012; G06F 3/03547; G06F 19/3481; G06F 3/01; G06F 3/014; G06F 3/038; G06F 3/0383; G06F 3/0414; G06F 3/04817; G06F 3/0482; G06F 3/04842; G06F 3/04883; G06F 1/1626; G06F 2203/04106; G06F 2203/04108; G06F 3/03545; G06F 3/0416; G06F 3/0418; G06F 3/046; G06F 3/0484; G06F 3/0486; G06F 3/0488; H04L 51/24; H04L 51/32
See application file for complete search history.

(56) References Cited

U.S. PATENT DOCUMENTS

| | | | | |
|---|---|---|---|---|
| 8,924,493 B1* | 12/2014 | Yeskel | .................... | G06F 9/542 709/206 |
| 2011/0271202 A1* | 11/2011 | Wong | .................... | G06Q 10/10 715/752 |
| 2012/0062371 A1* | 3/2012 | Radivojevic | ............ | G06F 3/016 340/407.1 |
| 2012/0112908 A1* | 5/2012 | Prykari | .................. | H04L 67/26 340/540 |
| 2015/0123775 A1* | 5/2015 | Kerdemelidis | .......... | G08B 6/00 340/407.1 |
| 2015/0347075 A1* | 12/2015 | Levesque | ............... | G06F 3/1423 345/3.1 |
| 2017/0072850 A1* | 3/2017 | Curtis | ............... | B60W 50/0097 |
| 2017/0294086 A1* | 10/2017 | Kerdemelidis | .......... | G08B 6/00 |
| 2018/0061191 A1* | 3/2018 | Alghooneh | ............. | G08B 6/00 |
| 2018/0093675 A1* | 4/2018 | Holub | .................. | B60W 50/14 |
| 2018/0270179 A1* | 9/2018 | Wren | ..................... | H04L 51/24 |

* cited by examiner

*Primary Examiner* — Djenane M Bayard
(74) *Attorney, Agent, or Firm* — Baker Botts L.L.P.

(57) ABSTRACT

In one embodiment, a method includes determining if notifications to be sent to user would benefit from being delivered by haptic stimulation under a current context. This determination may be made by accessing historical notification data of how the user previously responded to notifications in a similar context, and ranking conversion scores for each of one or more haptic-enabled delivery channels, wherein a conversion score indicates a probability of the user interacting with the notification. The most appropriate haptic message-delivery channel is selected based on the scores and historical data, and the notification is sent accordingly.

19 Claims, 11 Drawing Sheets

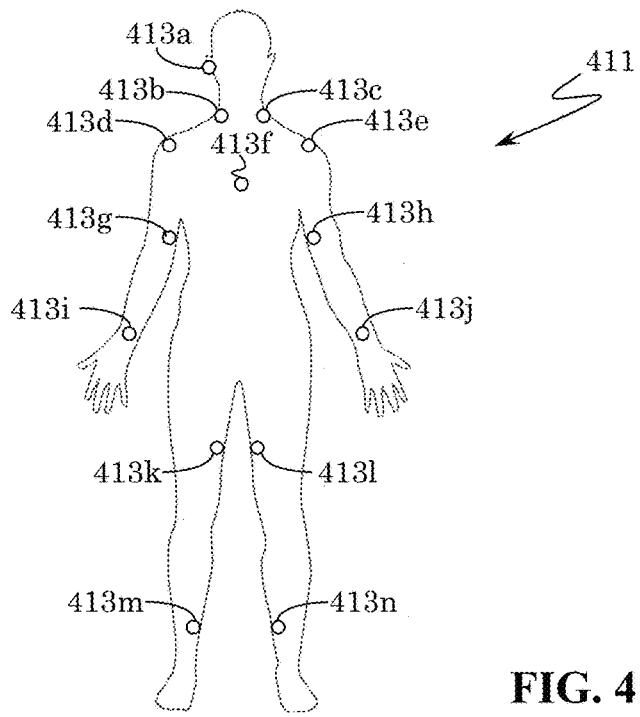

FIG. 4

| ID | ID-Personalized Haptic Stimulation |
|---|---|
| Mike | high intensity stimulation on inner-right upper arm; regular stimulation on inner-right forearm. |
| Joe | Cycle 2 times: regular stimulation on inner forearm; right upper leg; left-side of neck |
| Tom | draw ♡ symbol on right, inner forearm |
| Sam | Write ≢ on left inner upper arm |
| Emergency | Pulse high intensity stimulation at 2Hz for 3 seconds on all actuators simultaneously. |
| Call Home | Cycle 3 time: stimulation on left-and-right inner forearms simultaneously; on right ear |

FIG. 5

HAPTIC MESSAGE DELIVERY

TECHNICAL FIELD

This disclosure generally relates to delivering notifications to a user, and in particular, delivering notifications using haptic-enabled notification delivery channels.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a notification system may deliver notifications to a user in a user-aware manner. Such notifications may be sent through one or more delivery channels, e.g., sent by one or more communication media (e.g., SMS, MMS, email, application, voice) to one or more unique endpoints (e.g., a haptic-enabled delivery channel, a telephone number, an email address, a particular client device as specified by a unique device identifier). In particular embodiments, the haptic-enabled delivery channel may be reached via different existing delivery channels, e.g. the haptic-enabled delivery channel may correspond to a haptic device that has its own IMEI or MAC number. In particular embodiments, the haptic-enabled delivery channel may not have a direct communication channel to the notification system, but the haptic-enabled delivery channel may still be reached via another local device to which it may be linked. For example, the haptic-enabled delivery channel may be accessed via (e.g. routing through) a smartphone or computer. In particular embodiments, the notification system may utilize different techniques to attempt to provide a notification to a user in a manner that increases the likelihood that the user will interact with the notification.

In particular embodiments, a policy engine of the notification system may assess a number of different factors in order to determine delivery instructions for a notification. For any particular notification, the policy engine may assess (1) information associated with the notification (e.g., the source, the content, or the format) and (2) information associated with a particular user (e.g., demographic information for the user, the user's location, the user's available delivery channels and the status thereof, the user's current delivery context, user profile information, or social-networking information for the user), or (3) historical notification information about this particular user's responses to past notifications (e.g., conversion rates for different notification/context/delivery patterns) and about prior context/delivery patterns (if any) for the current notification (and interaction levels, if any, for those prior context/delivery patterns).

In particular embodiments, the notification system examines a notification to be sent to a user, and determines if a current delivery context of the user indicates a preference for delivery of notifications by haptic stimulation. If it does, then the notification system may select an optimal haptic-enabled delivery channel based on various criteria. For example, the notification system may retrieve, from a history service, (1) historical notification data associated with the user with respect to the current delivery context of the notification, and (2) ranking conversion scores for each of one or more haptic-enabled delivery channels, where a conversion score indicates a probability of the user interacting with the notification. A notification policy to apply to the notification is then determined based at least in part on the notification, the historical notification data, the conversion scores, or the current delivery context. The notification system may then elect to send the notification to at least one of the haptic-enabled delivery channels in accordance with the notification policy for delivery using haptic stimulation.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates a user using multiple haptic message-delivery devices.

FIG. 5 illustrates a mapping of predefined personal-identification haptic patterns

DESCRIPTION OF EXAMPLE EMBODIMENTS

Figure 1A:
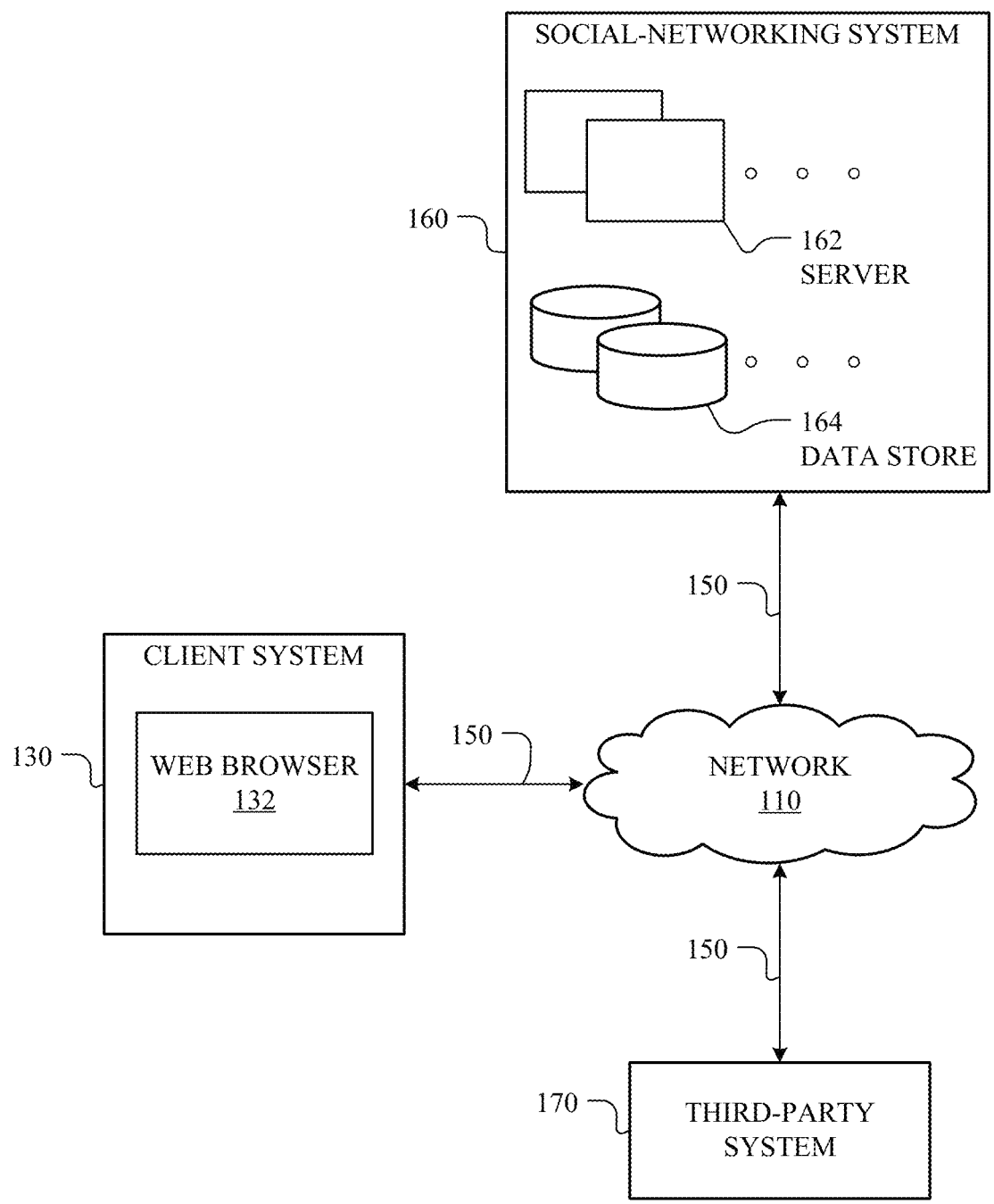
FIG. 1A illustrates an example network environment associated with a social-networking system.

In particular embodiments, a notification system may deliver notifications to a user in a user-aware manner. Such notifications may be sent through one or more delivery channels, e.g., sent by one or more communication media (e.g., SMS, MMS, email, application, voice) to one or more unique endpoints (e.g., a haptic-enabled delivery channel, a telephone number, an email address, a particular client device as specified by a unique device identifier). In particular embodiments, the haptic-enabled delivery channel may be reached via different existing delivery channels, e.g. the haptic-enabled delivery channel may correspond to a haptic device that has its own IMEI or MAC number. In particular embodiments, the haptic-enabled delivery channel may not have a direct communication channel to the notification system, but the haptic-enabled delivery channel may still be reached via another local device to which it may be linked. For example, the haptic-enabled delivery channel may be accessed wirelessly via (e.g. routing through) a smartphone or computer. In particular embodiments, the notification system may utilize different techniques to attempt to provide a notification to a user in a manner that increases the likelihood that the user will interact with the notification.

In particular embodiments, a policy engine of the notification system may assess a number of different factors in order to determine delivery instructions for a notification. For any particular notification, the policy engine may assess (1) information associated with the notification (e.g., the source, the content, or the format) and (2) information associated with a particular user (e.g., demographic information for the user, the user's location, the user's available delivery channels and the status thereof, the user's current delivery context, user profile information, or social-networking information for the user), or (3) historical notification information about this particular user's responses to past notifications (e.g., conversion rates for different notification/context/delivery patterns) and about prior context/delivery patterns (if any) for the current notification (and interaction levels, if any, for those prior context/delivery patterns).

In particular embodiments, the notification system, such as a Facebook server, may select a haptic-enabled delivery channel, among a plurality of message delivery channels, based on various criteria. In particular embodiments, the notification system accesses a notification to be sent to a user and determines a current delivery context of the user. The notification system may retrieve historical notification data associated with the user with respect to the determined current delivery context, and based on previous interactions by the user with notifications sent to the user under a similar context, identify a preferred notification delivery channel, which may be a haptic-enabled delivery channel. The notification system may also retrieve probability scores of multiple delivery channels (including haptic-enabled delivery channels) that indicate a probability of the user interacting with the notification. Based on the gathered information, the notification system (e.g., server) may selectively send the notification to one or more haptic-enabled delivery channels (e.g., channels including haptic message-delivery devices).

The selection of whether, or when, to send the notification to the haptic delivery channel may further be based social-networking information, such as a relationship between the user and the source of the notification or an affinity of the user for another user, or entity, associated with the content of the notification.

In particular embodiments, the haptic-enabled delivery channel (e.g., a delivery channel including a haptic message-delivery device) may selectively apply a sensory stimulation (e.g., pressure) to a user's skin, and an intensity of stimulation (e.g., amount of applied pressure) may be dependent upon a priority setting. Alternatively, the intensity of applied stimulation may be dependent upon an identity of the source of the notification.

In particular embodiments, a mapping of predefined personal-identification haptic patterns to message-sender IDs is maintained, and if the source of the notification matches one of the message-sender IDs, then the haptic message-delivery device may apply the predefined personal-identification haptic pattern mapped to the matched message-sender ID. The personal-identification haptic patterns may be symbolic, such as an ideogram.

The haptic message-delivery device may provide a tracing sensation on the user's skin to form patterns (such as letters, numbers, geometric shapes and ideograms) in accordance with the notification. The tracing sensation may be produced by a movable stimulation-actuator (e.g., movable within an X-Y plane) that selectively applies a pressure sensation (or other stimulation, e.g., heat, cold, pinprick, scratching, tracing) on the user's skin. The stimulation-actuator may be within a housing that provides movement control of the stimulation-actuator within a plane (which may be substantially parallel to a user's skin surface).

The stimulation-actuator may take various forms. For example, the stimulation-actuator may be an electromechanical solenoid having a movable armature directed to retract from, and extend to, the user's skin with variable speed and force (e.g., the armature may provide movement in a Z-direction traversing (e.g., perpendicular, or at an oblique angle) to an X-Y plane of movement of the stimulation-actuator). An end (or tip) of the moveable armature that extends to the user's skin may have a small (hard or soft) surface area (which may provide a sensation similar to a pen moving/tracing on the user's skin), or have a larger (soft or hard) surface area (which may provide a distributed pressure force such as a sensation similar to a small finger tracing a pattern on a user's skin), have any of multiple textures (e.g., rough, smooth, prickly), provide an active transfer of heat (e.g., be actively heated or cooled), apply a fixed or varying stimulation (e.g. vibration or stimulation application at a predefined frequency), or any combination of the above.

Alternatively, the stimulation-actuator might not provide a mechanism for extending (or moving) in the Z-direction. In this case, the stimulation-actuator may remain within its housing, and may provide a different mechanism for conveying a stimulus to the user's skin. For example, the stimulation-actuator may incorporate a blower that selectively applies air pressure (e.g., of selectable strength intensity) to the user's skin. As the stimulation-actuator is moved over the user's skin, the moving air pressure wave (e.g., moving column of air) may provide a tracing sensation on the user's skin. This has the benefit of not having to determine how far the movable armature directed needs to be extended in the Z-direction to reach the user's skin and apply a pressure (within a predefine pressure range). Using a movable armature to apply pressure to a user may require a calibration phase to an individual user's pressure preference (e.g., different users may have different skin sensitivity or have a lubricant on their skin (e.g. ointment, cream, perspiration, etc.) that my affect the tracing sensation produced by the movable armature.

Another example of a stimulation-actuator that may not provide a mechanism for moving in the Z-direction may make use of a patch or film enclosing ferrofluid (or other material that exhibits plasticity/deformation under an applied magnetic field). The film may be attached to the stimulation-actuator's housing and face the user's skin so as to be against the user's skin during use. The ferrofluid (e.g., ferroelectric gel) changes shape from a rest shape (e.g., a non-deformation resting state with no applied magnetic field) to an active shape (e.g., a deformed state under an applied magnetic field) in response to application of a magnetic field. By applying a magnetic field over a portion of the film, a local deformation (active shape) in the ferrofluid may be created within the portion of the film that receives the magnetic field. In this case, the active shape (local deformation) may be an expansion of ferrofluid that stretches the film and applies a pressure to the user's skin. The stimulation-actuator may include an electromagnet that selectively applies a magnetic field (e.g., of controllable strength) to select points (or portions) over the patch. Where the electric field is applied, the ferrofluid responds by creating a local deformation and applying a force against the user's skin. As the stimulation-actuator is moved, the local deformation on the film may move with the moving stimulation-actuator, which may cause a tracing sensation on the user's skin.

Optionally, the above-described stimulation-actuator having a single electromagnet, may be replaced with a stimulation-actuator having an array of electromagnets that span the surface of the ferrofluid film. In this case, the stimulation-actuator may be stationary within its housing. That is, the housing may include an array (or grid) of individually controllable (e.g. addressable) electromagnets, which as an aggregate may constitute the stimulation-actuator. The ferrofluid may be kept trapped between the array of electromagnets and a flexible film that faces the user's skin. In this case, the position of the active shape of the ferrofluid would correspond to the position of an actuated electromagnet(s). As select, adjacent electromagnets in the array are alternately turned on and off in a sequence, movement is imposed onto the active shape of the ferrofluid as it follows the sequence of turned on electromagnets.

In particular embodiments, the housing may impart two-dimensional (e.g., 2-axis planar) movement control of the stimulation-actuator by use of two pairs of opposing electric motors (arm-controllers) having respective arms extending toward each other and holding the stimulation-actuator between them in a gantry structure. In this case, a first of the two pairs of opposing motors provides first linear movement of the stimulation-actuator along a first axis of motion (e.g. X-axis), and a second of the two pairs of opposing motors provides second linear movement of the stimulation-actuator along a second axis of motion perpendicular to the first axis of motion (e.g., Y-axis). In this manner, the stimulation-actuator may move along either of the two arms to achieve two-dimensional, controlled movement.

Alternatively, the housing may provide planar movement control of the stimulation-actuator by used of a spirograph. For example, the spirograph may include a first gear wheel (e.g., first gear) having its exterior teeth engaged to (e.g., meshed with) interior teeth of a second gear wheel (e.g., second gear), and permitted to rotate within a circular area defined by the second gear wheel's interior teeth. The stimulation-actuator may be attached to a periphery region of the first gear wheel so that the stimulation-actuator moves in accord with movement of the first gear wheel. The first gear wheel may be coupled to a first rotary (e.g., stepper) motor (e.g., coupled to a first drive gear of the rotary motor) at a position off-centered from first gear wheel (e.g., within an area covered by the first gear wheel). For example, the first gear wheel may have a second set of teeth within its perimeter, and this second set of teeth may mesh (e.g., engage) with the first drive gear such that the first drive gear is within an area defined by the first and second sets of teeth of the first gear wheel (e.g., within the perimeter of the first gear wheel). The second gear wheel may have exterior teeth that engage with a second rotary (e.g., stepper) motor (e.g. to a second drive gear of the second rotary motor). With this configuration, the first wheel may be made to rotate (spin) about its own axis while moving along the interior teeth of the second gear. Basically, the axis of rotation of the first gear wheel may swing about the first drive gear (e.g., at a fixed distance), while the first gear wheel rolls about the interior of the second gear wheel. In this manner, the stimulation-actuator may be moved to any position within a circular area inside the perimeter of the second gear wheel. This may include an area overlapping the first drive gear (e.g., which may correspond to the axis of rotation of the second gear wheel) since the first gear wheel may overlap and enclose the first drive gear. Since the first gear wheel may be moved with precision within the second gear wheel, the first gear wheel may impart smooth controlled-motion to its attached stimulation-actuator.

It is to be understood that any stimulation-actuator may be combined (e.g., used) with any of the described mechanisms for moving a stimulation-actuator.

In particular embodiments, the haptic-enabled delivery channel may include a haptic system of multiple haptic-delivery devices that apply stimulation (e.g. pressure, heat, cold, vibration, etc.) to different members of a user's body in specific pattern sequences to convey information.

FIG. 1A illustrates an example network environment 100 associated with a social-networking system. Network environment 100 includes a client system 130, a social-networking system 160, and a third-party system 170 connected to each other by a network 110. Although FIG. 1A illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1A illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 1B:
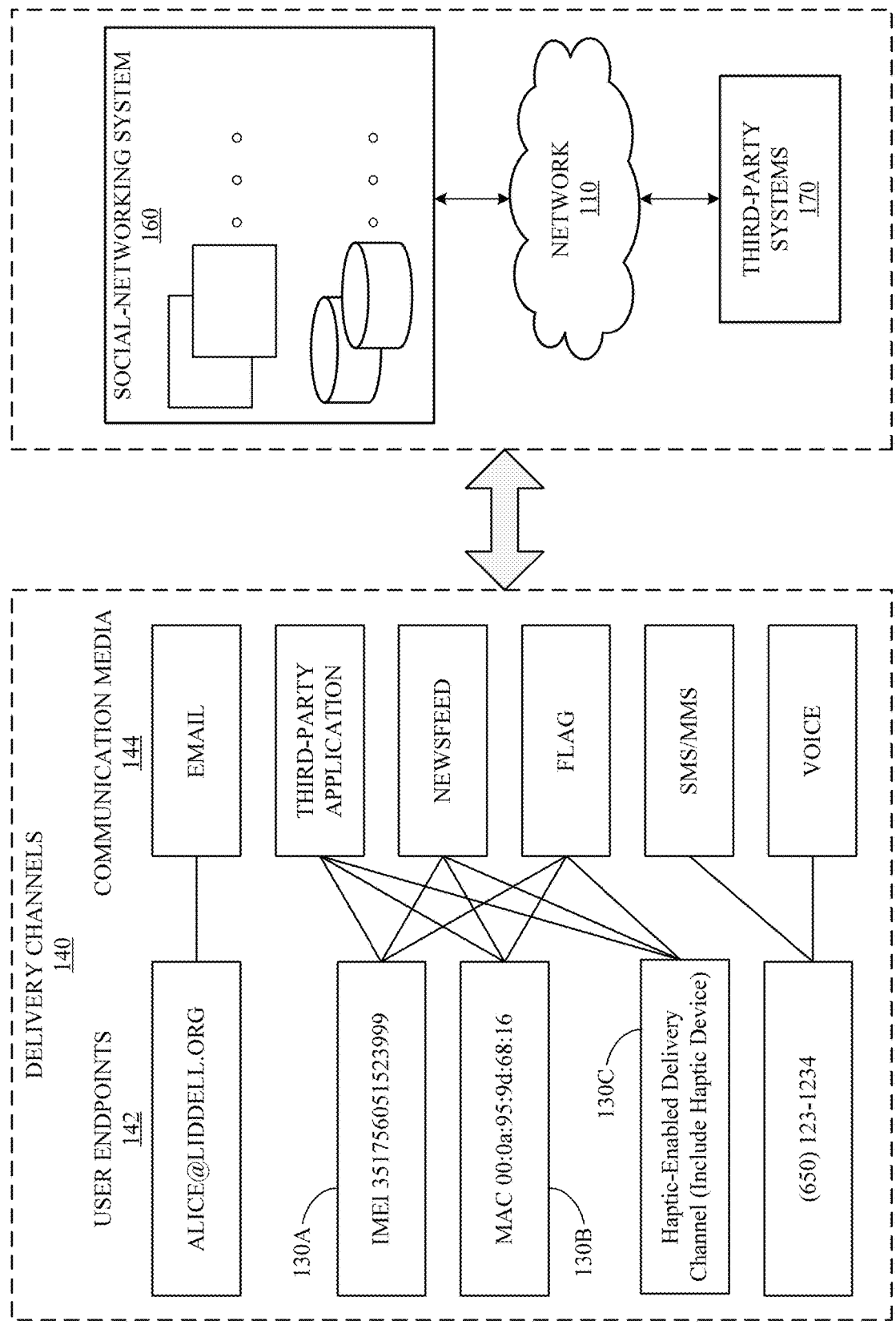
FIG. 1B illustrates an example architecture for delivering notifications to a user.

FIG. 1B illustrates an example architecture for delivering notifications to a user (Alice Liddell). In one example embodiment described herein, elements of the notification system may be implemented as part of a social-networking system, and the notification system may handle delivery of notifications generated by third-party systems as well as by the social-networking system itself. In particular embodiments, elements of the notification system may be implemented as part of a third-party system.

As shown in FIG. 1B, notifications may be delivered by way of a number of different delivery channels 140. As discussed above, a delivery channel 140 may comprise one or more uniquely-identified endpoint 142 and one or more communication media 144. As shown in FIG. 1B, notifications may be delivered by one or more communication media (e.g., SMS, MMS, email, application, voice, newsfeed, flag) to one or more unique endpoints (e.g., a telephone number, an email address, a particular client device (including one or more haptic message-delivery devices) as specified by a unique device identifier). In some embodiments, a particular communication media may be able to deliver a notification to more than one endpoint—for example, a third-party application such as SNAPCHAT may be installed on the user's smartphone client device 130A and also on the user's laptop 130B, and one or both of the smart client device 130A or user's laptop 130B may be linked to one or more haptic-enabled delivery channels 130C (each of which includes at least one haptic message-delivery device). That is, haptic-enabled delivery channels 130C may be uniquely addressable by the social networking system according to an IMEI or MAC address of their haptic message-delivery device, or they may be addressed via another local device linked to the haptic delivery channel. For example, if a haptic delivery channel cannot be directly accessed by the social-network system, the smart client device 130A or user's laptop 130B may receive message instructions to be conveyed (e.g., forwarded) to a locally linked (e.g., wirelessly) haptic delivery channel 130C. Communication media may be a push-type medium, such as SMS or email, or it may be a pull-type medium, such as newsfeed.

In particular embodiments, the notification system may select different delivery channels for notifications based on the user's available delivery channels and the status thereof. As discussed above, the information about the user's available delivery channels may be retrieved from the registration data store (e.g., information to enable the notification system to deliver the notification to a SNAPCHAT application). The notification system may also select different delivery channels for notifications based on the user's current delivery context, which may include device status. For example, if Alice's smartphone is currently placed in Silent mode, and she just checked in at a movie theater with her friends, then delivery of any notifications may be directed to a haptic delivery channel, which may be silent and not require illumination. Alternatively, delivery of notifications may be delayed until movement detected by the phone indicates that she is exiting the theater. The notification system may also choose to "escalate" a notification from a lower-ranked delivery channel (e.g., newsfeed) to a higher-ranked delivery channel (e.g., SMS) when re-delivering a notification, in order to increase the likelihood that the receiving user will interact with the notification. Higher-rank delivery channels may be linked to haptic delivery channels.

Figure 2:
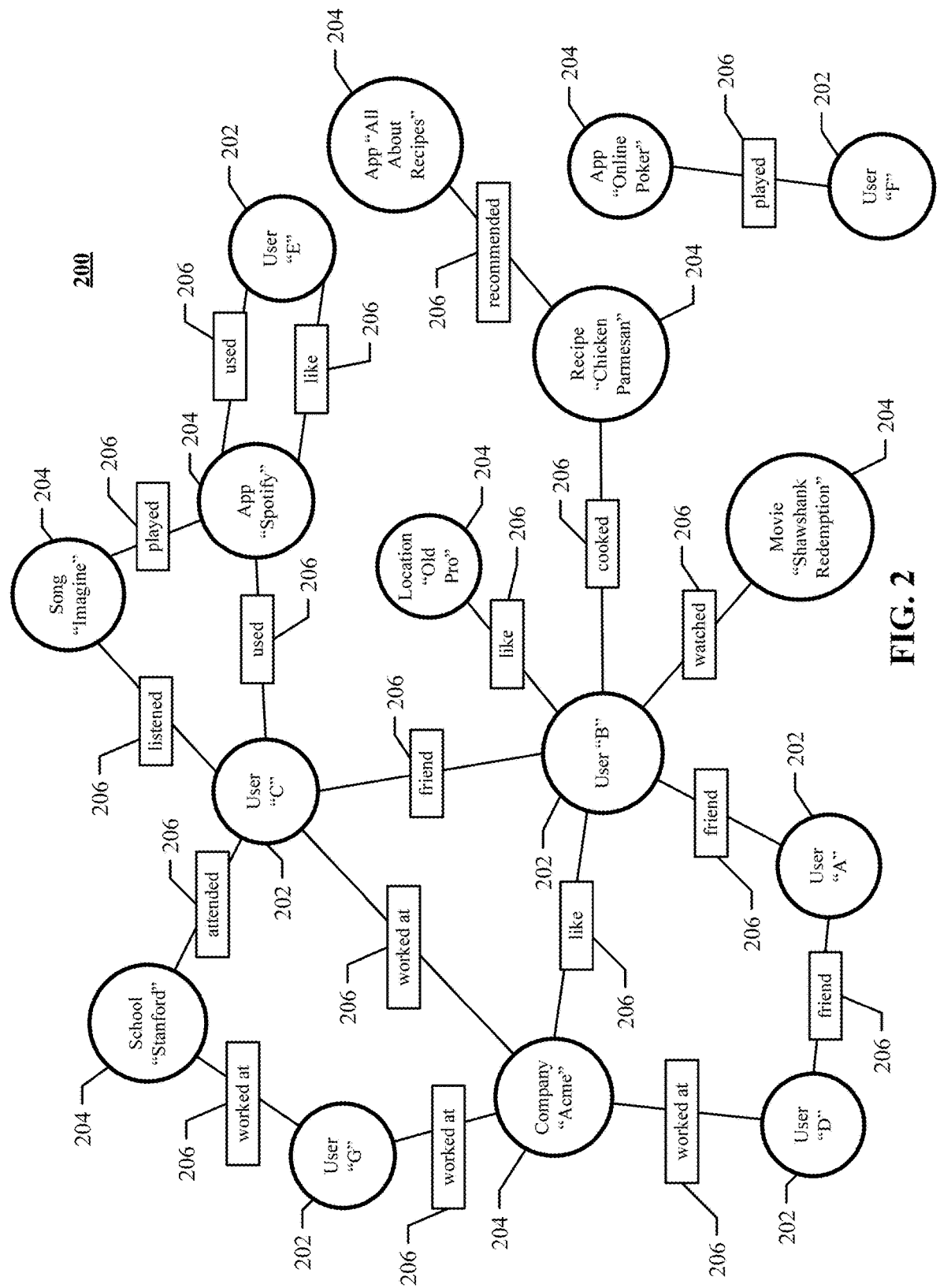
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 3:
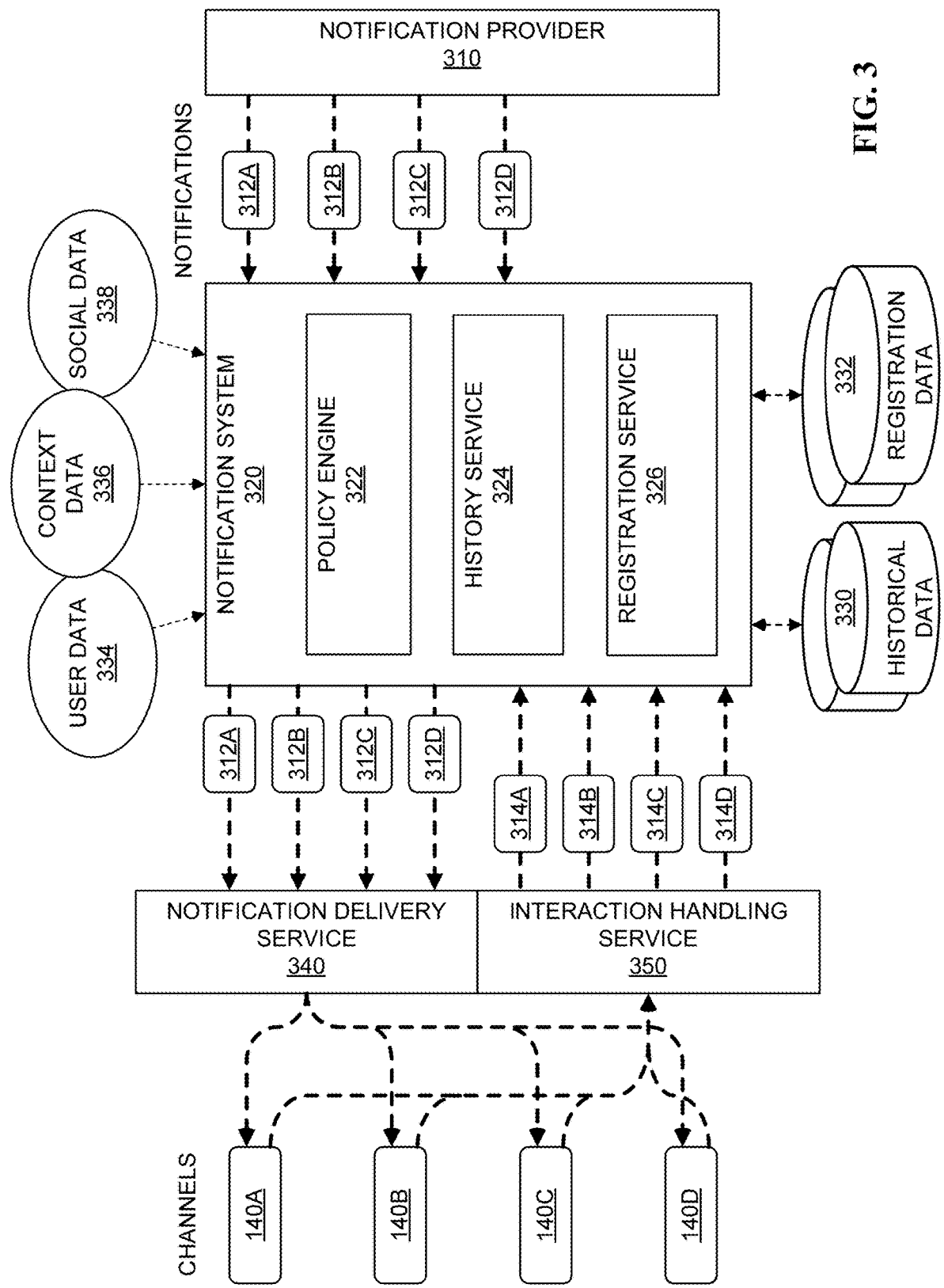
FIG. 3 illustrates an example embodiment of a notification system.

FIG. 3 illustrates an example embodiment of a notification system 320. A notification provider 310 may provide notifications 312 for delivery. Notification provider 310 may include the social-networking system or a third-party system. In the example embodiment illustrated in FIG. 3, notifications 312 may all be targeted to the same user, yet delivered differently, due to differences in the current context, the user's social-networking information relating to the content of the notification, the user's past history of interacting with notifications sent by a particular source, etc. In particular embodiments, policy engine 322 of notification system 320 may assess information associated with the notification (e.g., the source, the content, or the format). Such information may be provided within the content of notifications 312 or as associated metadata.

In particular embodiments, the policy engine 322 may also assess information associated with a particular user (e.g., demographic information for the user, the user's location, the user's available delivery channels 140 and the status thereof, the user's current delivery context, user profile information, or social-networking information for the user). The policy engine 322 may retrieve information about the user's available delivery channels 140 from registration data store 332. Information such as the demographic information for the user, user profile information, or social-networking information for the user may be retrieved as user data 334 and social data 338. Information about the user's current delivery context may be retrieved as context data 336—this category of information may cover any aspect of the user's current delivery context, such as, by way of example and not limitation: information about: a location of the user, a calendar associated with the user, an indicated status of the user, a scheduled event associated with the location, a trajectory of the user, a device status of one or more client devices associated with the user, or the user's current location with respect to other users to whom the user is connected in their social network.

In particular embodiments, policy engine 322 may also retrieve historical notification information about this particular user's responses to past notifications (e.g., conversion rates for different notification/context/delivery patterns) and about prior context/delivery patterns (if any) for the current notification (and interaction levels, if any, for those prior context/delivery patterns) from history service 324. Once policy engine 322 has considered the relevant factors and produced a policy to be applied to notifications 312, notification delivery service 340 may handle formatting and delivering the notification in accordance with the context/delivery pattern specified in the delivery policy.

Notification delivery service 340 may generate an appropriate form of the notification for delivery through a delivery channel 140, based on the features and capabilities of the underlying medium and endpoint. The notification delivery service may schedule the notification for delivery at a specified time and day, for delivery upon detecting a particular user delivery context (e.g., upon detecting that the user has begun actively using their mobile device; upon determining, based on the user's calendar information, that the user should be available; upon determining that the user's location has changed; upon determining that the user has moved within a threshold proximity to one or more social-networking contacts of the user; or upon determining that the user's haptic message-delivery device is active, e.g., being worn).

After having delivered the notifications to delivery channels 140, user interaction data 314 may be sent back to an interaction handling service 350, which sends the user interaction data 314 on to history service 324. History service 324 of the notification system may collect and analyze the user's responses to past notifications in order to determine the user's level of interaction (if any) with the past notifications. Information about the user's responses to past notifications may be stored in historical notification data store 330.

As is explained above, in particular embodiments, delivery channel 140 may include multiple different haptic-enabled delivery channels. Irrespective of the target endpoint of a notification, notification system 320 may elect to send the notification (or copies of the notifications or flags indicating the existence of the notifications) to one or more of the haptic-enabled delivery channels, which may be less intrusive since they may be silent and not require direct viewing. That is, haptic message-delivery devices may convey information by providing sensory stimulation to a user's skin. Notification delivery service 340 may handle formatting and delivering the notification to the selected one or more haptic-enabled delivery channels.

As an example, FIG. 4 illustrates a user 411 using multiple haptic message-delivery devices 413a to 413n. Each of haptic message-delivery devices 413a to 413n may be different, e.g., be of different size, type, provide a different type of sensory stimulation, and convey information in a different manner. For example, haptic message-delivery devices 413a to 413n may provide a heating or cooling stimulation to the skin, a pinpoint application force to the skin, a distributed pressure force to the skin, a vibration to the skin, a scratching sensation to the skin, a tracing sensation (e.g., tracing letters, numbers, symbols, etc.) to the skin, etc. In particular embodiments, a haptic message-delivery device may be integrated into a patch that may be adhered directly to human skin (such as haptic message-delivery devices 413b/413c, which may adhere to the neck, or haptic message-delivery devices 413d/413e, which may adhere to the shoulders). Other haptic message-delivery devices may be integrated into an item intended to be worn (such as haptic message-delivery devices 413a, which is worn on the ear, or haptic message-delivery devices 413i and 413j, which may be worn on the inner forearm by use of a band or strap). Irrespective of how a haptic message-delivery device is attached to a user, it may be advantageous to attach the haptic message-delivery device to areas of the human body that typically have more sensitive skin and less hair. For example, haptic message-delivery devices 413g and 413h may be applied to the inner upper arms, haptic message-delivery devices 413k and 413l may be applied to the inner upper leg, and haptic message-delivery devices 413m and 413n may be applied to the lower inner leg, and so on, as illustrated.

As is explained above, each of haptic message-delivery devices 413a to 413n may be a part of their own, respective and individual haptic-enabled delivery channel, which may receive notifications directly from notification provider 310, or which may be linked (e.g. wirelessly) to a local device (e.g., a cell phone) and receive notifications indirectly from notification provider 310 through the local device. Alternatively, a group of haptic-enabled delivery channels may constitute a haptic system that work in concert to apply stimulation (e.g. pressure, heat, cold, vibration, etc.) to different members of the user's body in specific pattern sequences to convey information.

In particular embodiments, each haptic-enabled delivery channel or system of haptic-enabled delivery channels may provide sensory stimulation in accordance with various criteria, which may be a part of a notification policy, as described above. For example, FIG. 5 illustrates a mapping of predefined personal-identification haptic patterns to ID (message-sender IDs or notification IDs). For example, sender ID "Mike" is associated with a change in an amount of applied stimulation (e.g., intensity of applied stimulation) by a haptic message-delivery device. That is, the amount of applied stimulation to the user's skin may be dependent upon an identity of the source of the notification. In the present case, Mike is identifiable by a his personalized haptic stimulation pattern that involves a system of haptic-enabled delivery channels to produce high intensity stimulation on the inner-right upper arm 413g followed by a regular stimulation on the inner-right forearm 413i. In the present case, if haptic message-delivery devices 413g and 413i provide a heat stimulation, then a high intensity stimulation would corresponding to a higher heat application. Similarly, if haptic message-delivery devices 413g and 413i provide an application force or vibration force, then the high intensity stimulation would correspond to a stronger application force or vibration force than typical.

The notification policy may be further based on a priority setting of a notification. For example, as illustrated in the case of a notification identified by ID "Emergency", the emergency setting is associated with a policy that increases the intensity of an applied stimulation to the user's skin. This is also the case with ID "Mike". In both cases, the importance associated with the ID (e.g., as determined by the policy engine 322) is conveyed as in increase in applied stimulation intensity. In particular embodiments, the importance level conveyed to a particular ID may be, at least in part, based on social-networking information, such as a relationship between the user and the source of the notification or an affinity (e.g., social graph affinity) of the user for another user, or entity, associated with the content of the notification.

As illustrated in the case of ID "Tom," the predefined personal-identification haptic patterns may include an ideogram representation, which may be conveyed by a single haptic message-delivery device. For example, haptic message-delivery device 413i may provide a tracing stimulation that permits it to trace figures, letters, number, foreign symbols (see "SAM" ID), etc. That is, in particular embodiments, a haptic message-delivery device may provide a tracing sensation on the user's skin to form patterns (such as letters, numbers, geometric shapes and ideograms) in accordance with the notification. The tracing sensation may be produced by a movable stimulation-actuator (e.g., movable within an X-Y plane) that selectively applies a pressure sensation (or other suitable stimulation) to achieve a tracing sensation on the user's skin. The stimulation-actuator may be encased within a housing, which may provide planar movement control of the stimulation-actuator.

Figure 6:
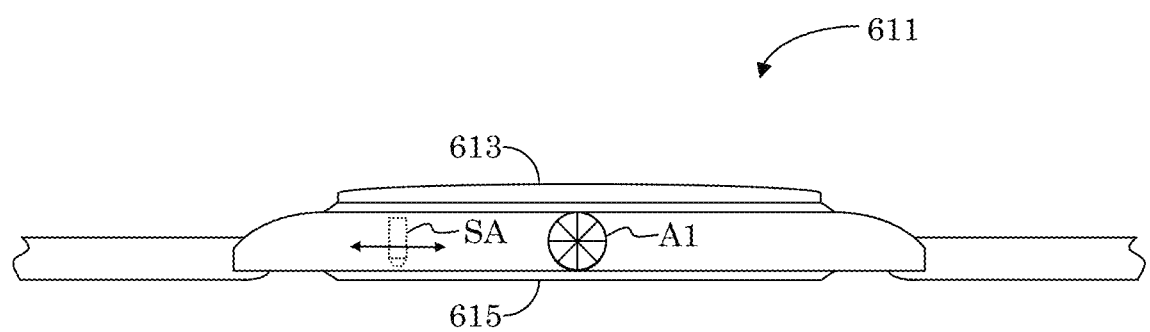
FIG. 6 illustrates an example housing for a haptic message-delivery device.

FIG. 6 illustrates an example housing for a haptic message-delivery device. In the present example, housing 611 is integrated into a wristwatch. The top of the wristwatch 611 may be covered by a glass or crystal window 613, and the back casing 615 of watch 611 may have a skin-interface for the haptic message-delivery device. For example, a stimulation-actuator SA is illustrated next to crown 615 in the present side-view of watch 611. Stimulation-actuator SA is illustrated in dotted lines to convey that it is internal to watch 611, and moveable along a plane parallel to the back casing 615. In the present example, stimulation-actuator SA may provide a moving stimulation (e.g., tracing stimulation) on a user's skin by tracing a pattern directly on the user's skin as the stimulation-actuator SA moves. Thus, the skin-interface may be an opening or flexible film or other conveyance method on the back casing 615 that permits stimulation-actuator SA to press against the user's skin as it conveys its tracing sensation.

Figure 7:
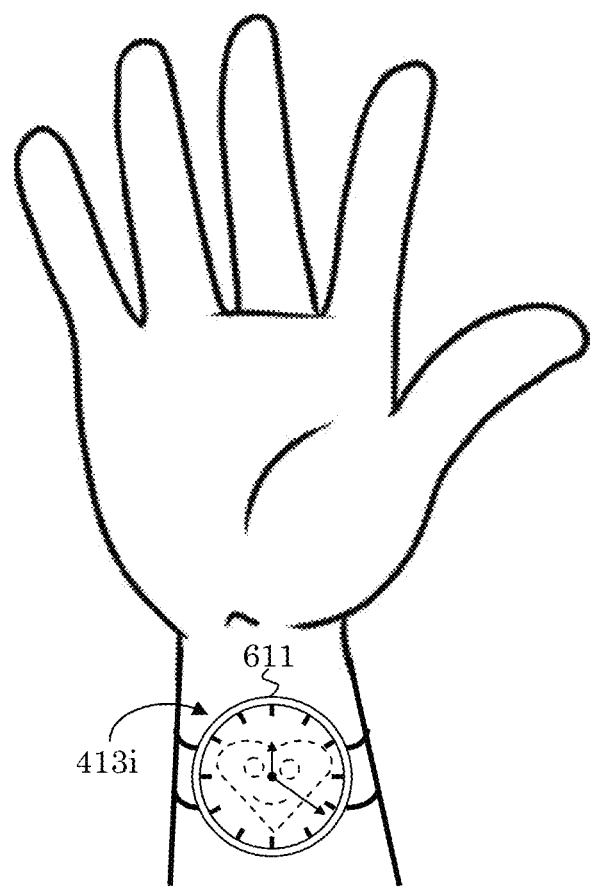
FIG. 7 illustrates an example use of the housing of FIG. 6.

FIG. 7 illustrates an example use of the housing of FIG. 6. In the present example, watch 611 is worn on the right, inner forearm so that that the skin-interface of the haptic message-delivery device (on the back of watch 611) is against the user's skin. Thus, the present haptic message-delivery device may correspond to haptic message-delivery device 413i of FIG. 4. Although the watch 611 is arranged so that its watch face is directly viewable by the user, for illustration purposes, a traced message (as it would be felt on the user's skin on the back of the watch 611) is illustrated in dotted lines. In the present example, the traced message corresponds to a personalized haptic pattern that identifies the source of the notification as ID "Tom" (see FIG. 5). A user would then recognize that Tom has sent a notification, and the user may be willing to check for Tom's notifications on another device, such as a smartphone, or receive the notification in tracing format on watch 611. For example, if the user is in a theater with his smartphone in silent mode, the user may determine that a message from Tom is important, and may respond by stepping out of the theater to access Tom's messages.

Figure 8:
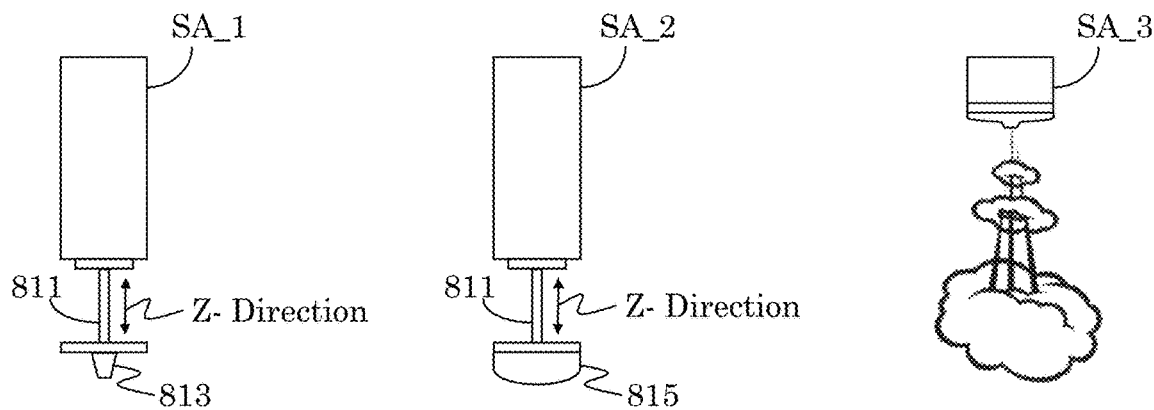
FIG. 8 illustrates several examples of a stimulator-actuator.

The stimulation-actuator SA may take various forms. FIG. 8 illustrates several examples of a stimulator-actuator. For example, the stimulation-actuator (SA_1 or SA_2) may be an electromechanical solenoid having a movable armature 811 directed to retract from, and extend to, the user's skin with variable speed and force (e.g., the armature 811 may provide movement in a Z-direction traversing (e.g., perpendicular, or at an oblique angle) to an X-Y plane of motion of the stimulation-actuator SA). In this manner the stimulation-actuator SA may be made to extend out of its housing, e.g. watch 611. An end (or tip, e.g., 813 or 815) of the moveable armature 811 that extends to the user's skin may have a small surface area (e.g., tip 813), be hard or soft, and provide a sensation similar to a pen moving/tracing on the user's skin. Alternatively, a tip (e.g., tip 815) may have a larger surface area, be soft or hard, and provide a distributed pressure force such as a sensation similar to a small finger moving tracing on a user's skin. The tips may have any of multiple textures (e.g., rough, smooth, prickly), and optionally provide an active transfer of heat (e.g., be actively heated or cooled).

In particular embodiments, the tip of a stimulation-actuator (e.g., 813 or 815) may have an active heating or cooling system to raise or lower its temperature with reference to an ambient temperature. For example, the tip (e.g., larger surface area tip 815) may be heated by a resistive heater (e.g., have heating element that produces heat by the passage of an electric current through a conductor) to apply heat stimulation to a user in addition to (or in place of) pressure force stimulation.

In particular embodiments, a stimulation-actuator (e.g., SA_3) may not provide a mechanism for extending (or moving) in the Z-direction. In this case, the stimulation-actuator may remain within its housing (e.g. watch 611), and may provide a different mechanism to convey a stimulus to the user's skin. For example, the stimulation-actuator SA_3 may incorporate a blower that selectively applies air pressure to the user's skin. As the stimulation-actuator is moved over the user's skin, a moving column of air pressure provides a tracing sensation on the user's skin. This may help the stimulation-actuator SA_3 accommodate a wide population of users since different people may have different skin sensitivity, and what may seem a soft touch by stimulation-actuators SA_1 or SA_2 to one user, may seem abrasive to another. Additionally, the applied air pressure may more easily accommodate differences in users' forearm shape, or other body parts, (e.g. accommodate for differences in mounds and valleys on users' skin). An applied air pressure may also be less susceptible to having its applied stimulation affected by lubricants on a user's skin (e.g. ointment, cream, perspiration, etc.).

Figure 9:
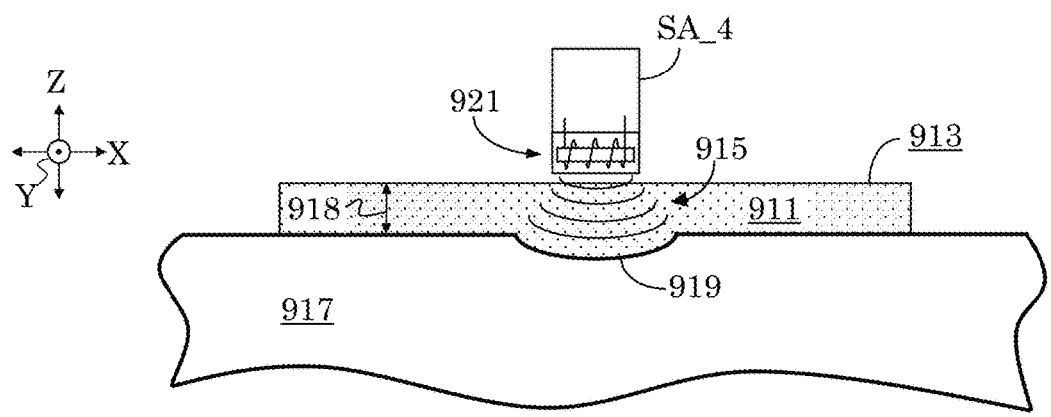
FIG. 9 illustrates a stimulator-actuator using a ferrofluid.

As another example, FIG. 9 illustrates a stimulator-actuator SA_4 using a ferrofluid 911. In the present example, a patch or film 913 that may enclose a ferrofluid 911 (or other material that exhibits plasticity under an applied magnetic field 915) may be placed against the user's skin 917. The ferrofluid 911 (e.g., ferroelectric gel) changes shape from a rest shape 918 (e.g., in a resting state with no applied magnetic field) to an active shape 919 (e.g., in an active state with an applied magnetic field) in response to application of a magnetic field 915. By applying a magnetic field 915 over a portion of the patch 913, a deformation (active shape 919) may be created within the portion of the patch 913 that receives the magnetic field 915. In this case, the active shape 919 (local deformation) is an expansion of ferrofluid and applies pressure against the user's skin. The stimulation-actuator SA_4 may include an electromagnet 921 that selectively applies a magnetic field 915 of variable strength on select points over the patch 913. Where the electric field is applied, the ferrofluid responds by deforming and applying a force on the user's skin. As the stimulation-actuator SA_4 is moved, the deformation 919 on the patch 913 moves with the stimulation-actuator SA_4, and a tracing sensation may be created on the user's skin.

Figure 10:
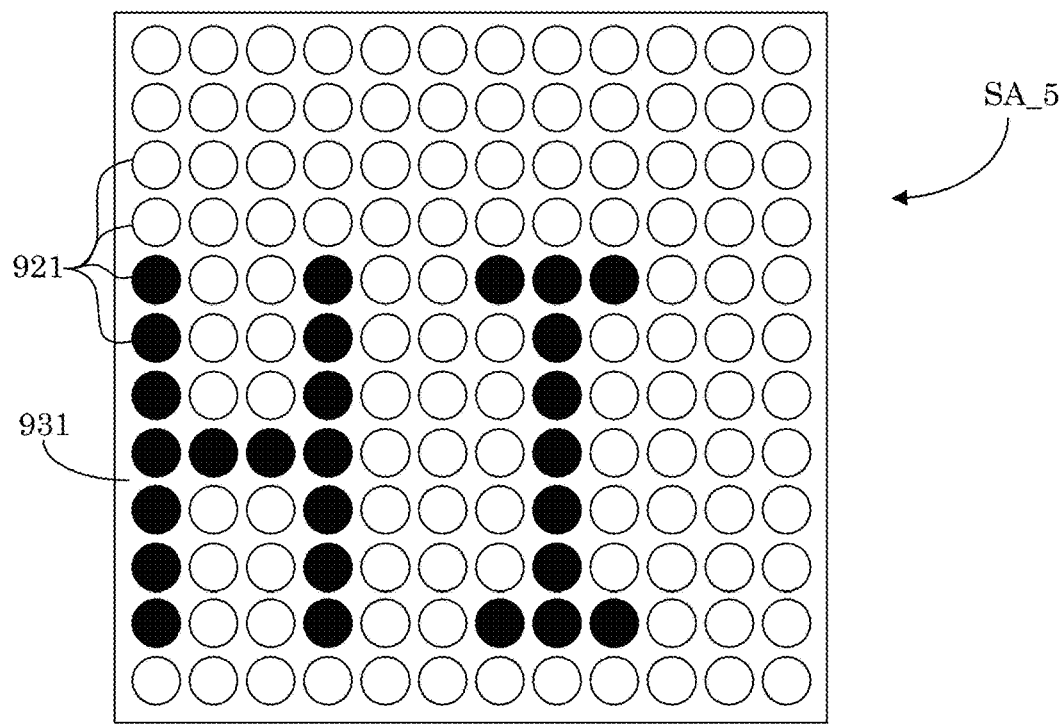
FIG. 10 illustrates a stimulation-actuator arranged as an array.

Optionally, the stimulation-actuator may be an array of electromagnets over the patch, or film. FIG. 10 illustrates a stimulation-actuator SA_5 arranged as an array. That is, the housing may include an array (or grid) of individually controllable (e.g. addressable) electromagnets 921, and the ferrofluid may be kept trapped between the array of electromagnets 921 and a flexible film 931 that faces the user's skin. In this case, the position of the active shape 919 (from FIG. 9) of the ferrofluid would correspond to the position of an actuated electromagnet. As select (e.g., adjacent) electromagnets in the array are alternately turned on and off in a sequence, movement is imposed onto the active shape of the ferrofluid, which may cause a tracing sensation on the user's skin.

For illustration purposes, FIG. 10 shows (as dark circles) electromagnets 921 that may that may be actuated (e.g., one-by-one) in sequence to define letters, e.g., "H" and "I". In particular embodiments, each letter may be traced separately, in a sequence spelling the word "HI." In particular embodiments, each tracing stroke may be defined separately in a manner similar to a pen writing on paper.

Figure 11:
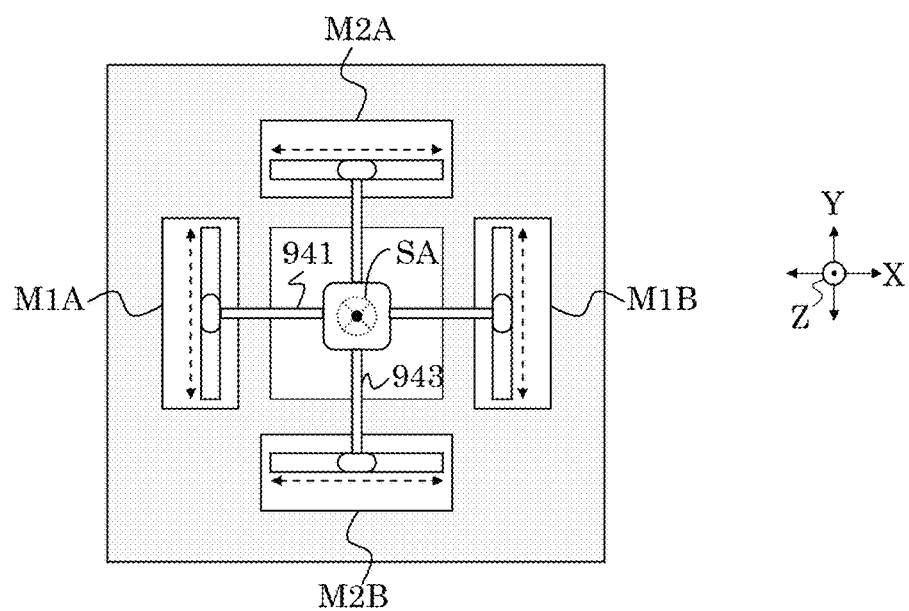
FIG. 11 illustrates a mechanism for providing 2-axis planar movement control of a stimulation-actuator.

FIG. 11 illustrates a mechanism for providing 2-axis planar movement control of a stimulation-actuator SA. In particular embodiments, the housing provides dual-axis planar movement control of the stimulation-actuator SA by use of two pairs of opposing arm-controllers (e.g. electric motors) M1A/M1B and M2A/M2B. The first pair of arm-controllers M1A/M1B has a first arm 941 extending toward each other and supporting the stimulation-actuator SA between them in a gantry structure. Similarly, the second pair of arm-controllers M2A/M2B has a second arm 943 extending toward each other and supporting the stimulation-actuator SA between them in a gantry structure. The first pair of arm-controllers M1A/M1B provide linear motion (in unison) of the stimulation-actuator in a first direction (e.g., the Y-direction), and the second pair of arm-controllers M2A/M2B provide linear motion (in unison) of the stimulation-actuator in a second direction (e.g., the X-direction) perpendicular to the first direction. In accordance with coordinated control of the two pairs of opposing arm-controllers, the stimulation-actuator may made move along either of the two arms to follow any desired path in a manner similar to a flatbed plotter.

Figure 12:
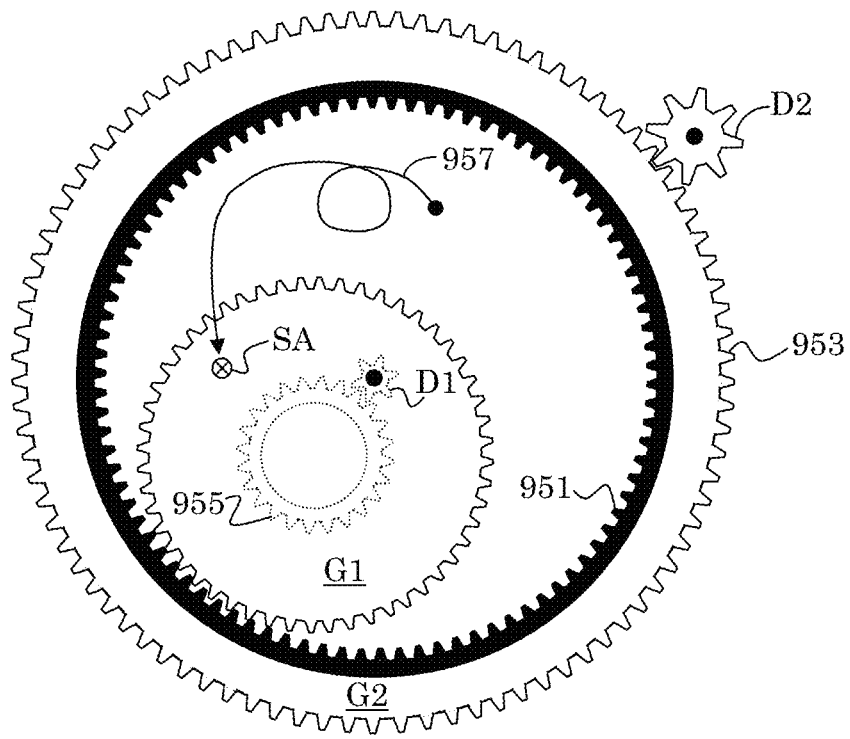
FIG. 12 illustrates a plan view of a spirograph for moving a stimulation-actuator.
Figure 13:
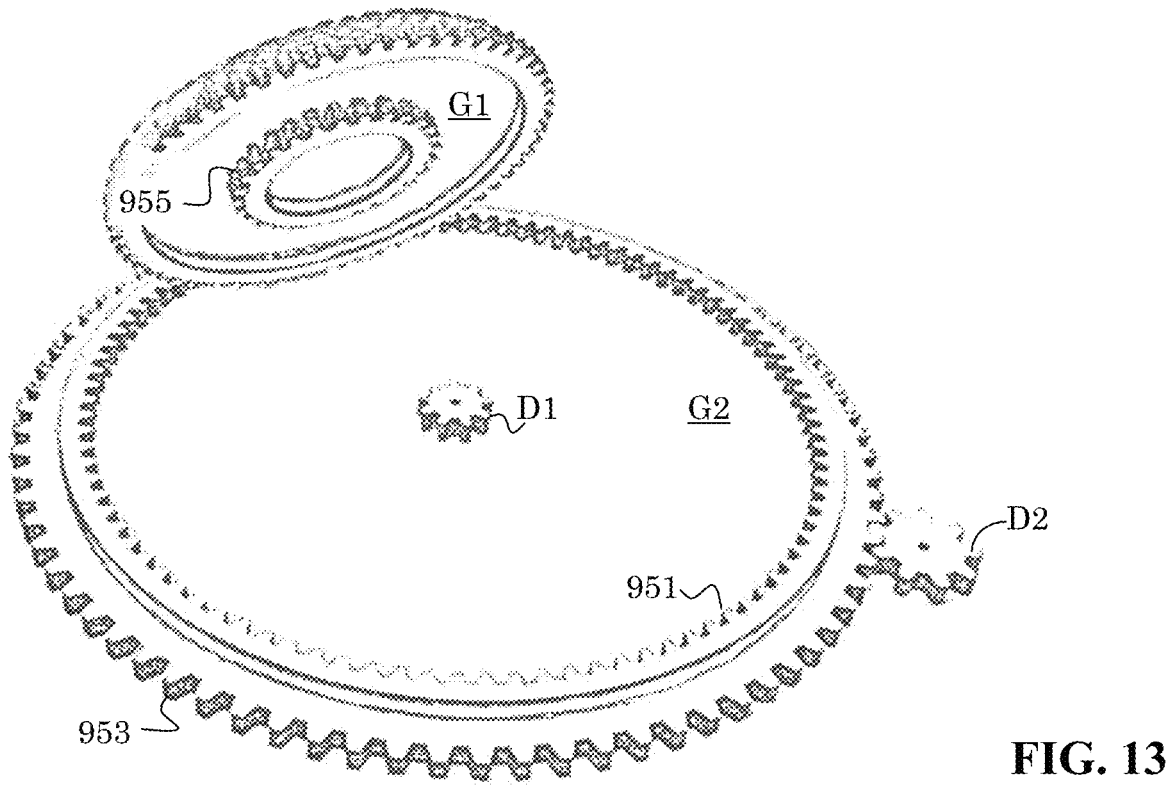
FIG. 13 illustrates a perspective view of a spirograph for moving a stimulation-actuator.

Alternatively, the housing may provide planar movement control of the stimulation-actuator SA by used of a spirograph. FIG. 12 illustrates a plan view of a spirograph for moving a stimulation-actuator SA. FIG. 13 illustrates a perspective view of a spirograph for moving a stimulation-actuator SA. In the present example, the spirograph may be constructed of a first gear (wheel) G1 engaged to interior teeth 951 of a second gear (wheel) G2, with the stimulation-actuator SA attached to a periphery region of the first gear G1 so that the stimulation-actuator SA moves in accord with movement of the first gear G1. Movement of the first gear G1 may be controlled by means of two rotary motors (not shown) driving two drive gears, D1 and D2. As illustrated in dotted lines, and more easily seen in FIG. 13, the first gear G1 has a second set of gear teeth 955 on its underside that engage with the first drive gear D1. The first gear G1 may thereby be coupled to first drive gear D1 at a position off-center from, and within the perimeter of, first gear G1 (e.g. toward a perimeter region of the first gear G1). The second gear G2 may have exterior teeth 953 that engage with the second drive gear D2 of the second rotary motor. With this configuration, the first gear G1 may be made to move (swing and rotate) with precise control within the second gear G2, and thereby provide smooth motion of the stimulation-actuator SA, as illustrated by movement path 957.

More specifically, the motion of the stimulation-actuator SA on first gear G1 may be controlled by modeling the spirograph as an elbowed robotic arm having one joint at the center of the first drive gear D1, a second joint (e.g., elbow) at the center of first gear G1, and an end point (end effector) at the position of the stimulation-actuator SA. By knowing a current position of the stimulation-actuator SA and knowing where its next position should be, inverse kinematics (e.g., an inverse Jacobean technique) may be used to determine how to control drive gears D1 and D2 to properly move the first gear G1 to achieve the desired motion of the stimulation-actuator SA.

Figure 14:
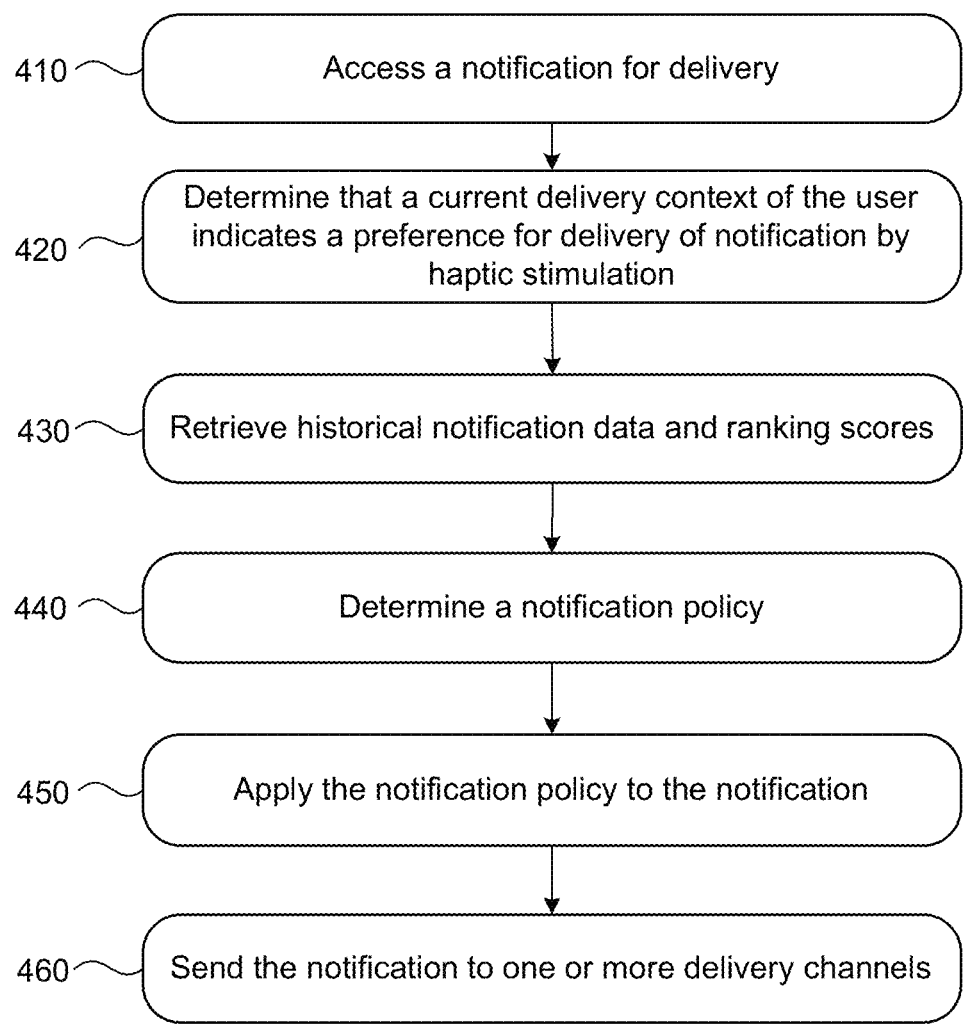
FIG. 14 illustrates an example method for handling notification delivery (including delivery via haptic-enabled delivery channels) in a user-aware manner.

FIG. 14 illustrates an example method for handling notification delivery (including delivery via haptic-enabled delivery channels) in a user-aware manner. In step 410, the notification system receives a notification to be delivered. For example, a social-networking message may be sent from user Alice's designated best friend on the social-networking system to Alice.

In step 420, the notification system determines information about the notification, such as (1) information associated with the notification (e.g., the source, the content, or the format) and (2) information associated with a particular user (e.g., demographic information for the user, the user's location, the user's available delivery channels and the status thereof, the user's current delivery context, user profile information, or social-networking information for the user). In this situation, the message may include buzzwords such as "hospital" and "accident." In addition, the message may be sent at 2:40 AM on a Sunday morning, and may include the name of a friend who is a first degree friend on Alice's social network. The message may also include the name of the hospital that the first degree friend is currently located at.

By retrieving information about Alice's current delivery context, the policy engine may determine that (1) the hospital is within 20 miles away from her based on a determination of her current location; (2) that she was actively using her mobile device 15 minutes prior to her best friend sending the message by the social-networking system; (3) that she typically goes to bed after 2:30 AM on Sunday mornings based on her historical activity, including pictures and posts uploaded to the social-networking website; (4) that she typically will place her phone face down on a surface prior to going to sleep (e.g., as determined by a minimum 4 hour period of inactivity of her mobile device). Based on her recent activity, historical activity, the current time being 2:40 AM, and the determination that Alice has not placed her phone face down on a surface, the policy engine may conclude that she is likely still awake (and likely to interact with the notification).

By retrieving social-networking information about Alice, the policy engine may determine that Alice, her best friend, and the first degree friend all went to high school together and live in the same neighborhood based on: her profile information and location information, her best friend's profile information and location information, the first degree friend's profile information and location information, and Alice's, best friend's and first degree friend's posts on the social-networking website. The policy engine may also determine that Alice, her designated best friend, and the first degree friend have a bunch scheduled for 11:00 AM that Sunday morning based on Alice's recent posts on the social-networking website. Thus, the policy engine may determine that Alice is very close with the first degree friend as well, and thus is more likely to respond to the message.

Under these circumstances, the policy engine may determine that the current delivery context of the user indicates a preference for delivery of notifications by haptic stimulation.

In step 430, the notification system retrieves historical notification data and ranking scores from the history service. The policy engine may also determine that Alice typically responds to messages sent by her designated best friend within an average of 2 minutes regardless of when the messages are sent to her based at least in part on her previous messaging data. In addition, the policy engine may determine that she typically responds to messages send after midnight within an average of 5 minutes. Thus, the policy engine may conclude that she typically responds to late night messages very quickly, and is very likely to respond to a message from her designated best friend. In addition, the policy engine may determine that she typically responds to messages sent to her mobile device on average within 10 minutes, messages sent to her laptop computer on average within 2 hours, emails to her mobile device and/or laptop computer on average within 30 minutes (and in particular, emails sent to her mobile device on average within 10 minutes), and voicemails to her mobile device within 3 hours. Thus, the policy engine may determine that she is more likely to respond to SMS messages (or haptic message-delivery devices) and emails sent to her mobile device than any other endpoint.

In step 440, the notification system determines a notification policy, which is applied to the notification in step 450. In particular embodiments, certain notification types (e.g., invitations to participate in a game) may be sent to certain delivery channels (e.g., newsfeed page) but never to certain other delivery channels (e.g., SMS to her cellphone). Given the nature of the communication, the notification policy may indicate that an SMS message should be re-sent to her mobile device once every five minutes until she interacts with the notification or dismisses it. In particular embodiments, the notification policy may also indicate that a voice call should be made to her mobile device (using an automated voice) in order to leave Alice a voicemail and/or to give her an opportunity to pick up the phone and to be connected to her best friend's cellphone.

Based on these determinations, the policy engine may determine that given the urgency and importance of the request, Alice is highly likely to interact with the notification of the message and to act upon the content of the notification of the message. Therefore, given the high level of importance of the notification, the delivery context of the notification, and the historical data, the notification policy indicates that the message is to be immediately delivered by all available media to all endpoints (including haptic message-delivery devices). In particular embodiments, once Alice has responded in one delivery channel to a notification sent by multiple delivery channels, any unopened notifications sent to other delivery channels may be recalled or retracted. In particular embodiments, due to the close nature of the friend and high priority (hospital being equated with an emergency), an increased intensity haptic stimulation may be warranted, as described above in reference to FIG. 5.

In step 460, the notification is sent to at least one of the haptic-enabled delivery channels in accordance with the notification policy for delivery using haptic stimulation.

Figure 15:
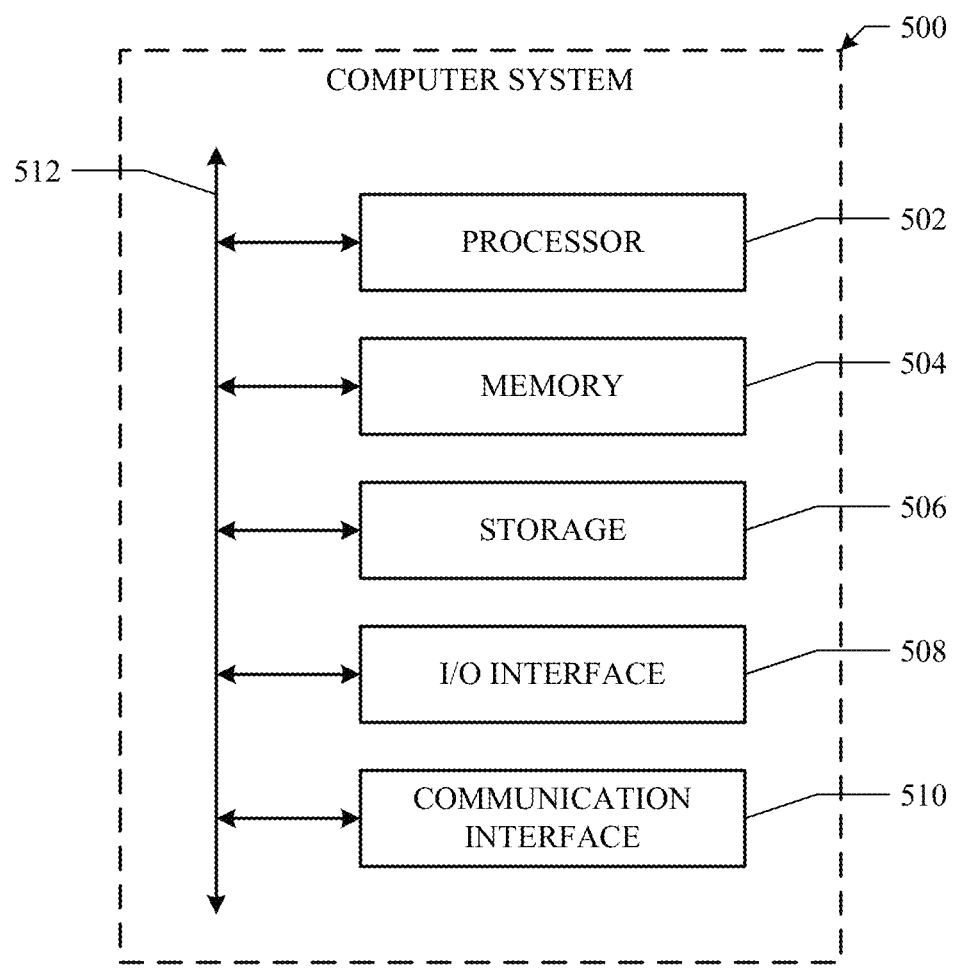
FIG. 15 illustrates an example computer system.

FIG. 15 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by one or more computing devices, accessing a notification to be sent to a user;
   by one or more computing devices, determining that a current delivery context of the user indicates a preference for delivery of notifications by haptic stimulation;
   by one or more computing devices, retrieving, from a history service:
      historical notification data associated with the user with respect to the current delivery context of the notification; and
      ranking conversion scores for each of one or more haptic-enabled delivery channels, wherein a conversion score indicates a probability of the user interacting with the notification;
   by one or more computing devices, determining a notification policy to apply to the notification based at least in part on the notification, the historical notification data, the conversion scores, or the current delivery context;
   by one or more computing devices, maintaining a mapping of predefined personal-identification haptic patterns to message-sender IDs, and the determining of the notification policy includes determining whether the source of the notification matches one of the mapped message-sender IDs, wherein the sending of the notification to the at least one of the haptic-enabled delivery channels includes executing the predefined personal-identification haptic pattern mapped to the message-sender ID that matches the source of the notification; and
   by one or more computing devices, selectively sending the notification to at least one of the haptic-enabled delivery channels in accordance with the notification policy for delivery using haptic stimulation.

2. The method of claim 1, wherein:
   the notification policy is further based on a priority setting for the notification;
   the one or more haptic-enabled delivery channels selectively apply stimulation to the user's skin; and
   an intensity of applied stimulation to the user's skin is dependent upon the priority setting.

3. The method of claim 1, wherein:
   the one or more haptic-enabled delivery channels selectively apply stimulation to the user's skin; and an amount of applied stimulation to the user's skin is dependent upon an identity of the source of the notification.

4. The method of claim 3, wherein the applied stimulation include at least one of an applied elevated temperature or lowered temperature from an ambient temperature.

5. The method of claim 3, wherein the applied simulation include at least one of an applied distributed pressure force, applied pin-point force, applied vibration, applied scratching, or applied tracing.

6. The method of claim 1, wherein the predefined personal-identification haptic patterns include ideogram representations of mapped message-sender IDs.

7. The method of claim 1, wherein at least one of the one or more haptic-enabled delivery channels provides a tracing sensation on the user's skin forming patterns in accordance with the notification, the tracing sensation on the user's skin being achieved by an actuator that applies a moving stimulation to the user's skin, and the actuator is within a housing.

8. The method of claim 7, wherein the patterns include letters, numbers, geometric shapes, or ideograms.

9. The method of claim 7, wherein the actuator is an electromechanical solenoid having an armature directed to retract from and extend towards the user's skin.

10. The method of claim 7, wherein the actuator is a blower that selectively applies air pressure to the user's skin.

11. The method of claim 7, wherein the actuator comprises ferrofluid that changes shape from a rest shape to an active shape in response to an applied magnetic field, the ferrofluid applying pressure to the user's skin when in its active shape.

12. The method of claim 11, wherein:
the housing includes an array of individually actuatable electromagnets;
the ferrofluid being trapped between the array of electromagnets and a flexible film that faces the user's skin;
and a position of the active shape of the ferrofluid corresponds to a position of an actuated electromagnet.

13. The method of claim 7, wherein the housing provides dual-axis planar movement control of the actuator, the housing including two pairs of opposing arm-controllers having respective arms extending toward each other and holding the actuator between them in a gantry structure, a first of the two pairs of opposing arm-controllers providing first linear movement of the actuator along a first axis of motion, and a second of the two pairs of opposing arm-controllers providing second linear movement of the actuator along a second axis of motion perpendicular to the first axis of motion.

14. The method of claim 7, wherein the housing provides planar movement control of the actuator by use of a spirograph.

15. The method of claim 14, wherein the spirograph includes a first gear wheel engaged to interior teeth of a second gear wheel, the actuator being coupled to a first perimeter region of the first gear wheel and moving in accord with movement of the first gear wheel, wherein the first gear wheel is engaged to a first rotary motor at a position off-center from, and within the perimeter of, the first gear wheel.

16. The method of claim 1, wherein the one or more haptic-enabled delivery channels include a haptic system of multiple haptic-delivery devices that apply stimulation to different members of the user's body in specific pattern sequences to convey information.

17. One or more computer-readable non-transitory storage media embodying software comprising instructions operable when executed to:
access a notification to be sent to a user;
determine that a current delivery context of the user indicates a preference for delivery of notifications by haptic stimulation;
retrieve, from a history service:
historical notification data associated with the user with respect to the current delivery context of the notification; and
ranking conversion scores for each of one or more haptic-enabled delivery channels, wherein a conversion score indicates a probability of the user interacting with the notification;
determine a notification policy to apply to the notification based at least in part on the notification, the historical notification data, the conversion scores, or the current delivery context;
maintain a mapping of predefined personal-identification haptic patterns to message-sender IDs, and the determining of the notification policy includes determining whether the source of the notification matches one of the mapped message-sender IDs, wherein the sending of the notification to the at least one of the haptic-enabled delivery channels includes executing the predefined personal-identification haptic pattern mapped to the message-sender ID that matches the source of the notification; and
selectively send the notification to at least one of the haptic-enabled delivery channels in accordance with the notification policy for delivery using haptic stimulation.

18. The media of claim 17, wherein:
at least one of the one or more haptic-enabled delivery channels includes a movable actuator that applies a stimulation to the user's skin, and the actuator being within a housing providing planar movement control of the actuator by use of a spirograph including a first gear wheel engaged to interior teeth of a second gear wheel, the actuator being coupled to a first perimeter region of the first gear and moving in accord with movement of the first gear wheel, wherein the first gear is fixed to a first rotary motor at a position off-centered from the first gear.

19. A system comprising: one or more processors; and a memory coupled to the processors comprising instructions executable by the processors, the processors being operable when executing the instructions to:
access a notification to be sent to a user;
determine that a current delivery context of the user indicates a preference for delivery of notifications by haptic stimulation;
retrieve, from a history service:
historical notification data associated with the user with respect to the current delivery context of the notification; and
ranking conversion scores for each of one or more haptic-enabled delivery channels, wherein a conversion score indicates a probability of the user interacting with the notification;
determine a notification policy to apply to the notification based at least in part on the notification, the historical notification data, the conversion scores, or the current delivery context;
maintain a mapping of predefined personal-identification haptic patterns to message-sender IDs, and the determining of the notification policy includes determining whether the source of the notification matches one of the mapped message-sender IDs, wherein the sending of the notification to the at least one of the haptic-enabled delivery channels includes executing the predefined personal-identification haptic pattern mapped to the message-sender ID that matches the source of the notification; and selectively send the notification to at least one of the haptic-enabled delivery channels in accordance with the notification policy for delivery using haptic stimulation.

\* \* \* \* \*